Patented May 31, 1938

2,119,493

UNITED STATES PATENT OFFICE 2,119,493

REACTING HYDROCARBONS WITH ALKALI METALS

Norman D. Scott, Sanborn, N. Y., assignor to E. I. du Pont de Nemours & Company, Wilmington, Del., a corporation of Delaware No Drawing. Application February 15, 1936, Serial No. 64,173

10 Claims. (Cl. 260—168)

This invention relates to improvements in the method of effecting the reaction of alkali metals with aromatic hydrocarbons, and more specifically to a method of effecting addition of alkali metals to naphthalene and other polycyclic aromatic hydrocarbons.

It is well known that alkali metals will react with a wide variety of aromatic hydrocarbons under a wide variety of conditions. An extensive review of this work has been published by C. B. Wooster, (Chemical Reviews, Vol. XI, pp. 1-91, August 1932). While most of the reactions described have been of little technical significance on account of the cost of the materials involved, there is particular interest in the attempts that have been made to react alkali metals with the cheaper hydrocarbons such as naphthalene. Schlenk (Annalen 463:90-95) carried out slow reactions using lithium in ethyl ether and obtained sufficient reaction in eight days with naphthalene, and in fourteen days with diphenyl, to permit some examination of the products formed. He represented the alkali metal compounds by the formulae,

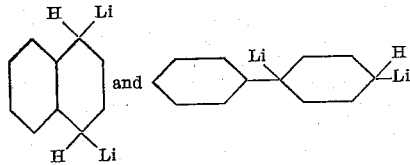

Schlenk, using ethyl ether as solvent, failed to get any detectable reaction of sodium with these hydrocarbons even in months. He attributed this to a poisoning effect on the sodium of minute traces of sulfur compounds present even in the best grades of naphthalene as supplied for a standard for calorimetry.

The reaction of sodium with naphthalene has also been studied to some extent using liquid ammonia as solvent. At ordinary temperatures, the reaction products are sodamide and tetralin. At low temperatures a red solution is obtained which has been shown by Wooster, [J. Am. Chem. Soc. 53:179-187 (1931)], to be in all probability a monosodium tetralin formed by addition of four atoms of sodium to one molecule of naphthalene, followed by immediate ammonolysis of three atoms of the sodium to sodamide as represented by the equations:

$$C_{10}H_8 + 4Na \rightarrow C_{10}H_8Na_4$$

$$C_{10}H_8Na_4 + 3NH_3 \rightarrow 3NaNH_2 + C_{10}H_{11}Na$$

Because of the large consumption of sodium and the reactivity of the ammonia used as solvent, this method is practically useless as a means of preparing acids or other derivatives from naphthalene.

An object of this invention is to provide a method for causing alkali metals, and specifically sodium, to be added to naphthalene and other polycyclic aromatic hydrocarbons such as anthracene, phenanthrene, acenaphthene, diphenyl, retene, and the like. A further object is to cause this reaction to be carried out at temperatures and under conditions favorable to the stability of the products; a further object is to provide a rapid reaction; my invention also includes the products formed by the herein described method, which products are reactive solutions of alkali metal addition compounds of naphthalene and other polycyclic aromatic hydrocarbons. Other objects will appear from the description of the invention.

I have found that certain solvents and classes of solvents have a very specific action in promoting the reaction of alkali metals with naphthalene to form addition products. As stated, the action of these solvents is specific, but I do not know whether their action is catalytic, whether the solvent itself takes part in the reaction in some manner, or whether there are some solubility or other physical factors involved.

The solvents which I have found of such remarkable activity and usefulness for these reactions are broadly in the class of tertiary amines, although not all of the members of the group are effective and of the effective ones some are better than others. I have found that trimethylamine, dimethyl ethylamine and tetramethyl methylene diamine are suitable solvents for this reaction; on the other hand, when other tertiary amines, for example triethylamine, diethyl methylamine or tetramethyl ethylene diamine, are used as solvents, the addition reaction between alkali metal and a polycyclic aromatic hydrocarbon does not occur to any appreciable extent.

The three tertiary amines mentioned above which I have found suitable as solvents for the herein described reactions when pure are substantially inert to the alkali metals and to the alkali metal addition compounds formed under the conditions of the reactions. In this respect they differ from primary and secondary amines which tend to react with alkali metals to liberate hydrogen or with the addition compounds to form hydrogenated hydrocarbons.

I have found that various inert materials, e. g., hydrocarbons or ether, which do not react with alkali metals and which themselves may not be suitable as solvents for the reaction, may be used as diluting agents for my effective tertiary amine solvents. When such diluted mixtures are used as solvent media, there must be a minimum amount of the effective tertiary amine present, in order to promote the reaction to the desired extent. This minimum amount will depend on the speed of reaction desired, since even a very small amount will have a proportionate effect in promoting the reaction and the reaction speed will increase in proportion as the concentration of the amine is increased. Also the required concentration of amine to obtain a given rate of reaction will depend on the relative power of that amine to promote the reaction; thus a smaller concentration of trimethylamine will be required than of dimethyl ethylamine. By taking these factors into consideration one may readily determine the proper concentration of amine for the desired reaction rate by experiment and thus may regulate the reaction rate as desired. Also, the tertiary amine solvents may be mixed with other materials which in themselves are suitable solvents for the reaction, e. g., with the ether solvents described and claimed in U. S. Patents 2,019,832; 2,023,793 and 2,027,000.

I have discovered that alkali metals can be added not only to naphthalene but also to other polycyclic aromatic hydrocarbons by the method of my invention. For example, alkali metal addition compounds of anthracene, phenanthrene, acenaphthene, diphenyl, dinaphthyl, retene and the like may thus be produced in good yields. The alkali-metal hydrocarbon compounds obtained in a tertiary amine solvent solution by the present invention is substantially identical in its chemical nature, with those obtained with ether solvents as described in the above mentioned U. S. patents. These tertiary amine solutions of the alkali metal addition compounds may be reacted with water, alcohols or other compounds which readily form sodium substitution compounds to form hydrogenated polycyclic aromatic hydrocarbons. For example, the sodium addition product of naphthalene, dissolved in trimethylamine will react with water or alcohol to form dihydronaphthalene with no hydrogen evolution. These solutions also readily react with carbon dioxide to form dicarboxy acids, wherein the alkali metal of the addition compound is replaced by the carboxy group. These solutions may be used in place of alkali metals in chemical syntheses and for various uses, e. g., the refining of hydrocarbons.

The following example is given by way of illustration:—

Example

Nineteen grams of naphthalene was dissolved in 100 grams of trimethylamine and to this solution, which was maintained at $-20°$ C. and under an atmosphere of nitrogen, was added 5.8 grams of sodium in the form of small chips. After agitating for approximately one hour, the sodium was dissolved, forming a green solution. The green solution was treated with carbon dioxide until the reaction mixture had become white. The trimethylamine was then distilled from the product, which then was dissolved in water to free it from naphthalene. The water solution, on treatment with hydrochloric acid, gave a high yield of isomeric dihydronaphthalene dicarboxylic acid $(C_{10}H_8(COOH)_2)$. The main portion of the acid precipitated from the water solution; some however remained in solution and was recovered by extraction with diethyl ether.

In carrying out these reactions, I have found it to be of importance to have the surfaces of the sodium clean. Thus the solvent should be purified by removal of such materials as will react with sodium and tend to form insoluble coatings thereon, under the conditions to be used, and the sodium should be protected from contact with such reactive materials from the time it is mechanically subdivided. Extreme fineness of sodium is not required although the rate will be dependent, among other things, on the extent of sodium surface, and this affords one means of controlling the rate. The naphthalene need not be of extreme purity. Technical flake naphthalene works quite satisfactorily. The complete absence of all sulfur compounds is not essential as shown by the fact that dimethyl sulfide can be used as an inert diluent in the reaction medium for the reaction of sodium with naphthalene. The presence of free $CO_2$ dissolved in the solvent in excessive amounts is likely to interfere with the reaction of sodium with naphthalene starting because of coating the sodium surface. On the other hand, when the reaction is well started, dry carbon dioxide then can be introduced and the carboxylation carried on simultaneously, as long as care is taken that the rate of carbon dioxide addition is insufficient to destroy completely all the green color of the sodium naphthalene compound, which will continue to be formed by the reaction of additional sodium present.

I claim:

1. A method of effecting the addition of an alkali metal to a polycyclic aromatic hydrocarbon which comprises reacting the alkali metal with said hydrocarbon in a reaction medium which comprises a tertiary amine selected from the group consisting of trimethylamine, dimethyl ethylamine and tetramethyl methylene diamine.

2. A method of effecting the addition of an alkali metal to a polycyclic aromatic hydrocarbon which comprises reacting the alkali metal with said hydrocarbon in a reaction medium which comprises trimethyl amine.

3. A method of effecting the addition of sodium to a polycyclic aromatic hydrocarbon which comprises reacting sodium with said hydrocarbon in a reaction medium which comprises a tertiary amine selected from the group consisting of trimethylamine, dimethyl ethylamine and tetramethyl methylene diamine.

4. A method of effecting the addition of an alkali metal to naphthalene which comprises reacting the alkali metal with naphthalene in a reaction medium which comprises a tertiary amine selected from the group consisting of trimethylamine, dimethyl ethylamine and tetramethyl methylene diamine.

5. A method of effecting the addition of sodium to naphthalene which comprises reacting sodium with naphthalene in a reaction medium which comprises a tertiary amine selected from the group consisting of trimethylamine, dimethyl ethylamine and tetramethyl methylene diamine.

6. A method of effecting the addition of sodium to naphthalene which comprises reacting sodium with naphthalene in a reaction medium which comprises trimethyl amine.

7. A composition of matter comprising an alkali metal addition compound of a polycyclic aromatic hydrocarbon dissolved in a solvent comprising a tertiary amine selected from the group consisting of trimethylamine, dimethyl ethylamine and tetramethyl methylene diamine.

8. A composition of matter comprising an alkali metal addition compound of a polycyclic aromatic hydrocarbon dissolved in a solvent comprising trimethylamine.

9. A composition of matter comprising a naphthalene alkali metal addition compound dissolved in a solvent comprising trimethylamine.

10. A composition of matter comprising naphthalene sodium addition compound dissolved in trimethylamine.

NORMAN D. SCOTT.